United States Patent
Ieda et al.

(10) Patent No.: US 7,665,591 B2
(45) Date of Patent: Feb. 23, 2010

(54) TWIN-CLUTCH DEVICE

(75) Inventors: Yoshihisa Ieda, Saitama (JP); Akihiko Tomoda, Saitama (JP); Yoshihisa Kanno, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 444 days.

(21) Appl. No.: 11/642,869

(22) Filed: Dec. 21, 2006

(65) Prior Publication Data

US 2007/0144858 A1 Jun. 28, 2007

(30) Foreign Application Priority Data

Dec. 28, 2005 (JP) ............................. 2005-377449

(51) Int. Cl.
*F16D 21/02* (2006.01)
(52) U.S. Cl. ............... 192/48.91; 192/87.11; 192/87.15
(58) Field of Classification Search .............. 192/87.11, 192/87.15, 106 F, 48.9, 48.91
See application file for complete search history.

(56) References Cited

U.S. PATENT DOCUMENTS

| 2,632,539 | A | * | 3/1953 | Black | 192/3.27 |
| 3,017,006 | A | * | 1/1962 | Dence et al. | 192/113.35 |
| 4,947,974 | A | * | 8/1990 | Smemo et al. | 192/85 AA |
| 2004/0206599 | A1 | * | 10/2004 | Hegerath | 192/87.11 |
| 2008/0087517 | A1 | * | 4/2008 | Mori et al. | 192/87.11 |

FOREIGN PATENT DOCUMENTS

| EP | 1 195 537 A1 | 4/2002 |
| JP | 8-277852 A | 10/1996 |
| JP | 2001-304293 A | 10/2001 |
| JP | 2005-24100 A | 9/2005 |
| JP | 2006-312998 A | 11/2006 |

* cited by examiner

*Primary Examiner*—Sherry Estremsky
(74) *Attorney, Agent, or Firm*—Birch, Stewart, Kolasch & Birch, LLP

(57) ABSTRACT

To reduce the axial size of a twin-clutch device including first and second clutch actuating mechanisms arranged in parallel along the axes of first and second driven shafts that are coaxial. A first clutch disconnection/connection control mechanism is provided for switching disconnection/connection of the first clutch actuating mechanism. A second clutch disconnection/connection control mechanism is provided for switching disconnection/connection of the second clutch actuating mechanism. A second clutch disconnection/connection control mechanism is arranged between first and second clutch inners so that at least a part of the second clutch disconnection/connection control mechanism is accommodated in at least one of first and second cylinder portions.

17 Claims, 3 Drawing Sheets

TWIN-CLUTCH DEVICE

CROSS-REFERENCE TO RELATED APPLICATIONS

The present application claims priority under 35 USC 119 to Japanese Patent Application No. 2005-377449 filed on Dec. 28, 2005 the entire contents of which are hereby incorporated by reference.

BACKGROUND OF THE INVENTION

1. Field of the Invention

The present invention relates to a twin-clutch device with a first clutch actuating mechanism including a first clutch outer that is continuous to a driving rotary member, and a first clutch inner having a first cylinder portion coupled to a first driven shaft in a relatively non-rotatable manner. A second clutch actuating mechanism includes a second clutch outer that is continuous to the driving rotary member. A second clutch inner is provided having a second cylinder portion coupled to a second driven shaft in a relatively non-rotatable manner. A first clutch disconnection/connection control mechanism is provided for exerting on the first clutch actuating mechanism a controlling force for switching disconnection/connection of the first clutch actuating mechanism. A second clutch disconnection/connection control mechanism is provided for exerting on the second clutch actuating mechanism a controlling force for switching disconnection/connection of the second clutch actuating mechanism. The first and second clutch actuating mechanisms are arranged in parallel along the axes of the first and second driven shafts that are coaxial.

2. Description of Background Art

A twin-clutch device is known as disclosed JP-A No. H08-277852. However, in the twin-clutch device disclosed in JP-A No. H08-277852, the first and second clutch disconnection/connection control mechanisms are arranged axially outward with respect to the first and second clutch actuating mechanisms that are arranged side by side in the axial direction. This results in an increase in the size of the twin-clutch device with respect to the axial direction.

SUMMARY AND OBJECTS OF THE INVENTION

The present invention has been made in view of the above-mentioned circumstances. It is an object of an embodiment of the present invention to provide a twin-clutch device that can be made compact with respect to the axial direction.

In order to achieve the above-mentioned object, according to an embodiment of the present invention there is provided a twin-clutch device with a first clutch actuating mechanism including a first clutch outer that is continuous to a driving rotary member, and a first clutch inner having a first cylinder portion and coupled to a first driven shaft in a relatively non-rotatable manner. A second clutch actuating mechanism includes a second clutch outer that is continuous to the driving rotary member, and a second clutch inner having a second cylinder portion coupled to a second driven shaft in a relatively non-rotatable manner. A first clutch disconnection/connection control mechanism is provided for exerting on the first clutch actuating mechanism a controlling force for switching disconnection/connection of the first clutch actuating mechanism. A second clutch disconnection/connection control mechanism is provided for exerting on the second clutch actuating mechanism a controlling force for switching disconnection/connection of the second clutch actuating mechanism. The first and second clutch actuating mechanisms are arranged in parallel along the axes of the first and second driven shafts that are coaxial. The second clutch disconnection/connection control mechanism is arranged between the first and second clutch inners so that at least a part of the second clutch disconnection/connection control mechanism is accommodated in at least one of the first and second cylinder portions.

Further, according to an embodiment of the present invention there is provided a twin-clutch device having a first clutch actuating mechanism including a first clutch outer that is continuous to a driving rotary member, and a first clutch inner having a first cylinder portion coupled to a first driven shaft in a relatively non-rotatable manner. A second clutch actuating mechanism includes a second clutch outer that is continuous to the driving rotary member, and a second clutch inner having a second cylinder portion and coupled to a second driven shaft in a relatively non-rotatable manner. A first clutch disconnection/connection control mechanism is provided for exerting on the first clutch actuating mechanism a controlling force for switching disconnection/connection of the first clutch actuating mechanism. A second clutch disconnection/connection control mechanism is provided for exerting on the second clutch actuating mechanism a controlling force for switching disconnection/connection of the second clutch actuating mechanism. The first and second clutch actuating mechanisms are arranged in parallel along the axes of the first and second driven shafts that are coaxial, wherein the first and second clutch disconnection/connection control mechanisms are arranged radially inward with respect to the first and second cylinder portions.

According to an embodiment of the present invention, the first clutch disconnection/connection control mechanism includes a piston and an urging member. The piston includes a back surface faced to a hydraulic pressure chamber so that the piston is actuated to advance in a direction for compressing a plurality of first and second friction plates, which are provided in the first clutch actuating mechanism so as to be arranged in a mutually overlapping manner, in accordance with an increase in hydraulic pressure in the hydraulic pressure chamber, the urging member is accommodated in an urging-member accommodating chamber, to which a front surface of the piston is faced, for urging the piston in a retracting direction. The hydraulic pressure chamber and the urging-member accommodating chamber are arranged radially inward with respect to the first cylinder portion of the first clutch inner provided to the first clutch actuating mechanism that is arranged axially outward with respect to the second clutch actuating mechanism.

According to an embodiment of the present invention, the first and second clutch outers are coupled together coaxially and integrally.

According to an embodiment of the present invention, the first and second clutch disconnection/connection control mechanisms each include a piston and an urging member, the piston including a back surface faced to a hydraulic pressure chamber so that the piston is actuated to advance in a direction for compressing a plurality of friction plates, which are respectively provided in the first and second clutch actuating mechanisms so as to be arranged in a mutually overlapping manner, in accordance with an increase in hydraulic pressure in the hydraulic pressure chamber. The urging member is accommodated in an urging-member accommodating chamber, to which a front surface of the piston is faced, for urging the piston in a retracting direction. An oil passage is provided for introducing oil to the urging-member accommodating chamber to cancel a centrifugal force exerted on oil supplied to the hydraulic pressure chamber. An oil discharge passage is provided for discharging oil to the outside from the urging-member accommodating chamber. The oil passages are provided in an accommodating-chamber forming member having at least a part thereof faced to the urging-member accommodating chamber.

Further, according to of an embodiment of the present invention, first and second hydraulic pressure passages for exerting hydraulic pressures on the hydraulic pressure chambers of the first and second clutch disconnection/connection control mechanisms in a mutually independent manner are provided coaxially within a shaft that penetrates the first and second clutch disconnection/connection control mechanisms.

It should be noted that the first main shaft 7 in the first and second embodiments corresponds to the first driven shaft according to the present invention, the second main shaft 8 in the first and second embodiments corresponds to the second driven shaft according to the present invention. The first and second cylinder members 26, 81 in the first embodiment correspond to the accommodating-chamber forming member according to an embodiment of the present invention. The clutch spring 74 in the first embodiment corresponds to the urging member according to an embodiment of the present invention. The clutch springs 74, 78 in the first embodiment correspond to the urging member according to an embodiment of the present invention.

According to an embodiment of the present invention, the second clutch disconnection/connection control mechanism is arranged between the first and second clutch inners respectively provided to the first and second clutch actuating mechanisms that are arranged coaxially side by side. At least a part of the second clutch disconnection/connection control mechanism is accommodated in at least one of the first and second cylinder portions respectively provided to the first and second clutch inners. Accordingly, the second clutch disconnection/connection control mechanism can be arranged by effectively utilizing the dead space between the first and second cylinder portions, and the first and second driven shafts, thereby allowing the two-clutch device to be made more compact with respect to the axial direction.

Further, according to an embodiment of the present invention, the first and second clutch disconnection/connection control mechanisms are arranged radially inward with respect to the first and second cylinder portions constituting part of the first and second clutch inners respectively provided to the first and second clutch actuating mechanisms that are arranged coaxially side by side. Accordingly, the first and second clutch disconnection/connection control mechanisms can be arranged by effectively utilizing the dead space formed between the first and second cylinder portions, and the first and second driven shafts, whereby the two-clutch device can be made more compact with respect to the axial direction. In addition, the inertial mass of the twin-clutch device can be reduced, thus allowing power from the drive source to be transmitted without causing a decrease in responsiveness.

According to an embodiment of the present invention, the hydraulic pressure chamber and urging-member accommodating chamber of the first clutch disconnection/connection control mechanism for switching disconnection/connection of the first clutch actuating mechanism, which is arranged axially outward with respect to the second clutch actuating mechanism, are arranged radially inward with respect to the first cylinder portion of the first clutch inner. Thus, the twin-clutch device can be made more compact with respect to the axial direction.

According to an embodiment of the present invention, the clutch outer is shared between the first and second clutch actuating mechanisms, thereby making it possible to reduce the number of parts.

According to an embodiment of the present invention, the centrifugal force exerted on the oil supplied to the hydraulic pressure chamber can be canceled by supplying oil to the urging-member accommodating chamber, and the oil discharged from the urging-member accommodating chamber can be used as the lubricating oil for the first and second clutch actuating mechanisms. Accordingly, the provision of dedicated oil passages for the lubrication of the first and second clutch actuating mechanisms becomes unnecessary, thereby making it possible to reduce the number of machining man-hours.

Further, according an embodiment of the present invention, it is possible to simplify the structure of the hydraulic pressure passages for exerting hydraulic pressures on the hydraulic pressure chambers of the first and second clutch disconnection/connection control mechanisms.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiment modes of the present invention will be described below by way of embodiments of the present invention shown in the attached drawings.

Figure 1:
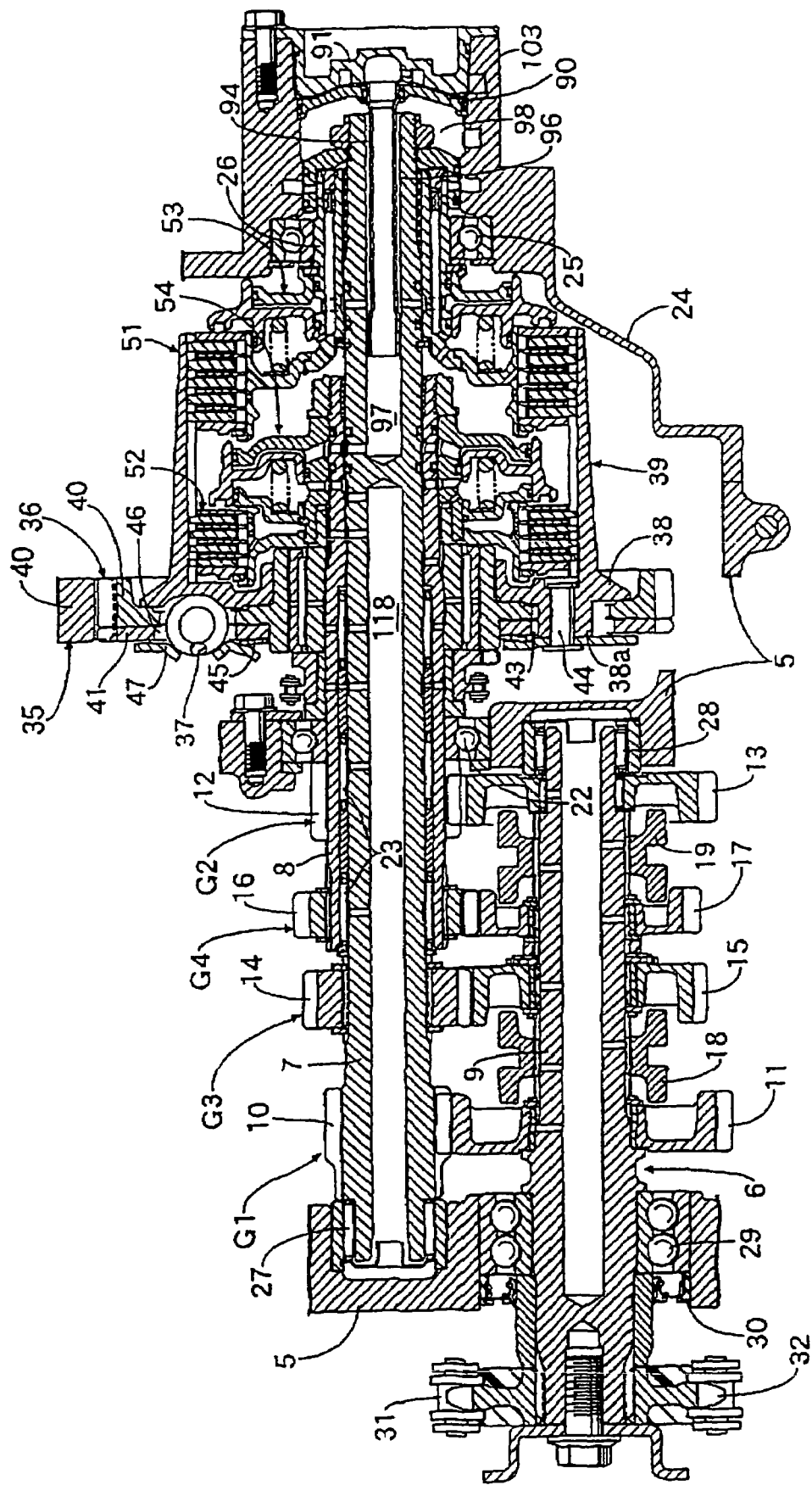
FIG. 1 is a longitudinal sectional view showing a part of an engine according to a first embodiment of the present invention.
Figure 2:
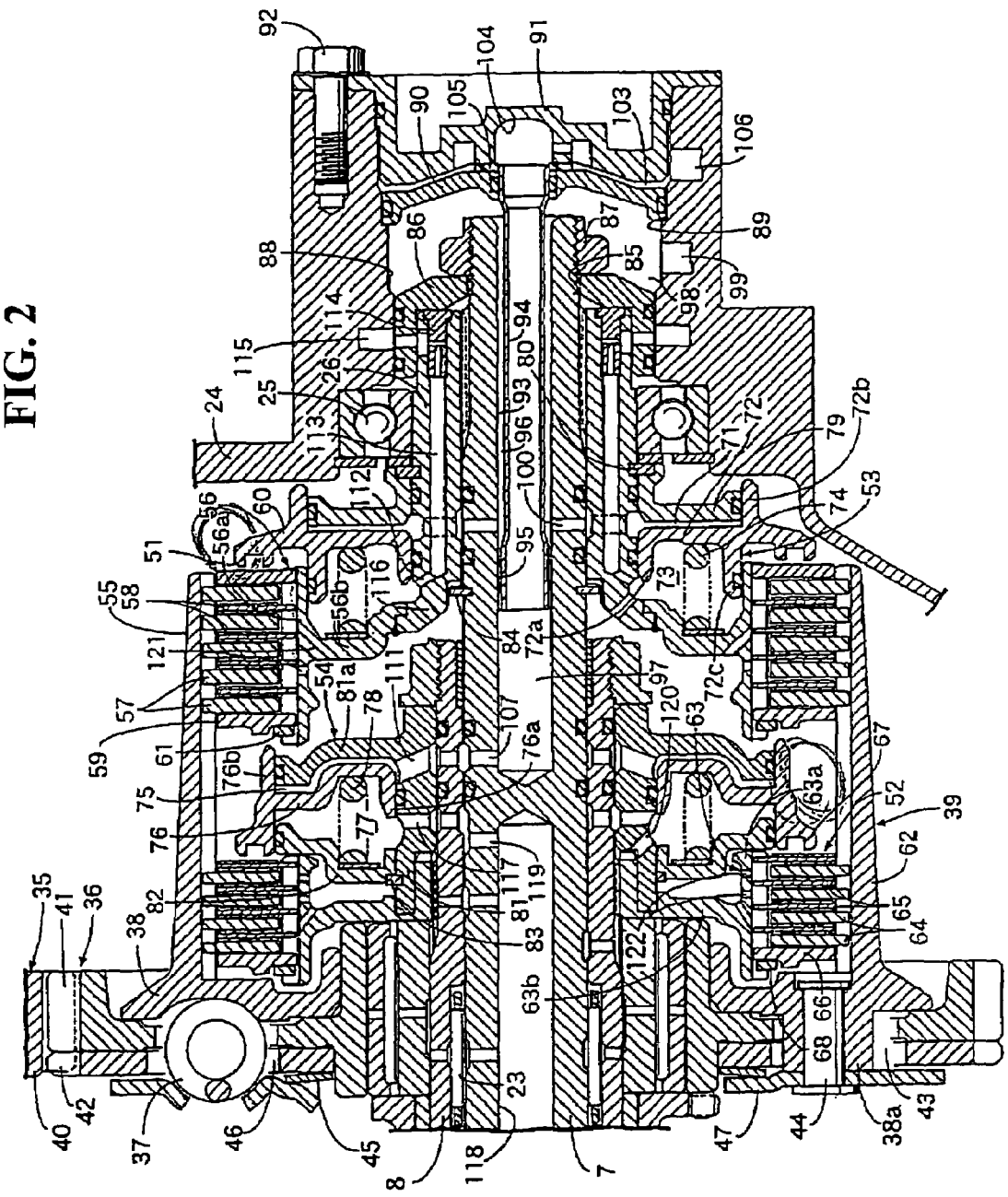
FIG. 2 is an enlarged view of the main portion of FIG. 1.

FIGS. 1 and 2 show a first embodiment of the present invention, of which FIG. 1 is a longitudinal sectional view showing a part of an engine, and FIG. 2 is an enlarged main portion view of FIG. 1.

As illustrated in FIG. 1, for example, a crankcase 5 equipped to an engine mounted to a motorcycle accommodates a transmission 6 including a plurality of speeds of gear trains that can be selectively established, for example, first to fourth-speed gear trains G1, G2, G3, G4. The first-speed gear train G1 includes a first-speed driving gear 10 provided integrally with a first main shaft 7, and a first-speed driven gear 11 rotatably supported on a countershaft 9, which is parallel to the first main shaft 7, and brought into meshing engagement with the first-speed driving gear 10. The second-speed gear train G2 includes a second-speed driving gear 12 provided integrally with a second main shaft 8 that is coaxial with the first main shaft 7, and a second-speed driven gear 13 rotatably supported on the countershaft 9 and brought into meshing engagement with the second-speed driving gear 12. The third-speed gear train G3 includes a third-speed driving gear 14 fixed to the first main shaft 7, and a third-speed driven gear 15 rotatably supported on the countershaft 9 and brought into meshing engagement with the third-speed driving gear 14. The fourth-speed gear train G4 includes a fourth-speed driving gear 16 fixed to the second main shaft 8, and a fourth-speed driven gear 17 rotatably supported on the countershaft 9 and brought into meshing engagement with the fourth-speed driving gear 16.

A first shifter 18 is spline-coupled to the countershaft 9 between the first and third-speed driven gears 11, 15. Through axial movement of the first shifter 18, it is possible to switch between a state in which the first and third-speed driven gears 11, 15 are allowed to freely rotate with respect to the countershaft 9, and a state in which either one of the first and third-speed driven gears 11, 15 is coupled to the countershaft 9 in a relatively non-rotatable manner. Further, a second shifter 19 is spline-coupled to the countershaft 9 between the second and fourth-speed driven gears 13, 17. Through axial movement of the second shifter 19, it is possible to switch between a state in which the second and fourth-speed driven gears 13, 17 are allowed to freely rotate with respect to the countershaft 9, and a state in which either one of the second and fourth-speed driven gears 13, 17 is coupled to the countershaft 9 in a relatively non-rotatable manner.

The intermediate portion of the second main shaft 8 formed in a cylindrical configuration rotatably penetrates the crankcase 5, with a ball bearing 22 being interposed between the crankcase 5 and the second main shaft 8. Further, the first main shaft 7 penetrates the second main shaft 8 in a relatively rotatable manner while keeping a constant axial position relative to the second main shaft 8, with a plurality of roller bearings 23 being interposed between the first main shaft 7 and the second main shaft 8. Further, a first cylinder member 26 is fitted and fixed to one end portion of the first main shaft 7, and a ball bearing 25 is interposed between the first cylinder member 26 and a cover 24 that is coupled to the crankcase 5. Further, the other end portion of the first main shaft 7 is rotatably supported on the crankcase 5 via a roller bearing 27.

One end portion of the countershaft 9 is rotatably supported on the crankcase 5 via a roller bearing 28. The other end portion of the countershaft 9 rotatably penetrates the crankcase 5, with a ball bearing 29 and an annular seal member 30 being interposed between the other end portion of the countershaft 9 and the crankcase 5. A drive sprocket 32 is fixed to the projecting end portion of the countershaft 9 from the crankcase 5 such that a chain 31 for transmitting power to a rear wheel (not shown) is wound thereon.

In addition, the power of a crankshaft 35 equipped in the engine is input to a driving rotary member 38 via a primary speed reducer 36 and a damper spring 37. A twin-clutch device 39 according to an embodiment of the present invention is provided between the driving rotary member 38 and each of the first main shaft 7 as a first driven shaft and the second main shaft 8 as a second driven shaft.

Referring also to FIG. 2, the primary speed reducer 36 includes a driving gear 40 provided integrally with the crankshaft 35, a first driven gear 41 that is supported on the second main shaft 8 in a relatively rotatable manner and is brought into meshing engagement with the driving gear 40, and a second driven gear 42 that is supported on the first driven gear 41 so as to be capable of rotating relative to the first driven gear 41 within a limited range to absorb the backlash between the driving gear 40 and the first driven gear 41, and is brought into meshing engagement with the driving gear 40.

The driving rotary member 38 abuts on the first driven gear 41 from the side opposite to the second driven gear 42. Connecting bosses 38a, that project from a plurality of circumferential locations of the driving rotary member 38, are inserted through elongated holes 43 provided in the first and second driven gears 41, 42 so as to extend in a circumferentially elongated manner. Further, a retainer plate 47, which is opposed to the second driven gear 42 on the side opposite to the first driven gear 41, abuts against the end face of the connecting bosses 38a. The retainer plate 47 abuts against the end face of the connecting bosses 38a by means of rivets 44 passing through each of the connecting bosses 38a. Furthermore, a disc spring 45, which exerts a spring force for bringing the driving rotary member 38 into abutment against the first driven gear 41, is provided between the retainer plate 47 and the second driven gear 42.

Further, circumferentially elongated retention holes 46 are provided in the first and second driven gears 41, 42 at a plurality of locations that are circumferentially offset from the respective elongated holes 43. The damper spring 37, which exerts a spring force for rotating the first and second driven gears 41, 42 relative to each other, is received in each of the retention holes 46 so as to be interposed between the driving rotary member 38 and the retainer plate 47, and the first and second driven gears 41, 42.

The twin-clutch device 39 includes a first clutch actuating mechanism 51 provided between the driving rotary member 38 and the first main shaft 7, a second clutch actuating mechanism 52 provided between the driving rotary member 38 and the second main shaft 8, a first clutch disconnection/connection control mechanism 53 for exerting on the first clutch actuating mechanism 51 a controlling force for switching disconnection/connection of the first clutch actuating mechanism 51, and a second clutch disconnection/connection control mechanism 54 for exerting on the second clutch actuating mechanism 52 a controlling force for switching disconnection/connection of the second clutch actuating mechanism 52. The first and second clutch actuating mechanisms 51, 52 are arranged in parallel along the axial direction of the first and second main shafts 7, 8 that are coaxial, with the first clutch actuating mechanism 51 being located on the outer side.

Referring to FIG. 2, the first clutch actuating mechanism 51 includes a first clutch outer 55 that is formed in the shape of a cylinder coaxially surrounding the first main shaft 7 and is continuous to the driving rotary member 38, a first clutch inner 56 having a ring-like first connecting plate portion 56b that is integrally continuous to a first cylinder portion 56a coaxially surrounded by the first clutch outer 55, a plurality of first friction plates 57 that are engaged with the first clutch outer 55 in a relatively non-rotatable manner, a plurality of second friction plates 58 that are engaged with the first cylinder portion 56a of the first clutch inner 56 in a relatively non-rotatable manner and are arranged alternately with respect to the first friction plates 57, a pressure receiving plate 59 engaged with the first cylinder portion 56a in a relatively non-rotatable manner while being opposed to, from among the first and second friction plates 57, 58 that are arranged in a mutually overlapping manner, the friction plate (in this embodiment, the first friction plate 57) arranged at the driving rotary member 38 side end, and a pressing ring 60 for compressing the first and second friction plates 57, 58 between the pressing ring 60 and the pressure receiving plate 59. A snap ring 61, which abuts on and engages with the inner periphery of the pressure receiving plate 59 from the side opposite to the first and second friction plates 57, 58, is mounted onto the first cylinder portion 56a.

The first connecting plate portion 56b of the first clutch inner 56 projects radially inward from the axially intermediate portion of the inner periphery of the first cylinder portion 56a. The inner peripheral portion of the first connecting plate portion 56b is welded and coupled to the first cylinder member 26 that is fitted and fixed onto the first main shaft 7. That is, the first connecting plate portion 56b is connected to the first main shaft 7 via the first cylinder member 26 in a relatively non-rotatable manner.

The second clutch actuating mechanism 52 is arranged between the first clutch actuating mechanism 51 and the driving rotary member 38. The second clutch actuating mechanism 52 includes a second clutch outer 62 that is formed in the shape of a cylinder coaxially surrounding the second main shaft 8 and is continuous to the driving rotary member 38, a second clutch inner 63 having a ring-shaped second connecting plate portion 63b that is integrally continuous to a second cylinder portion 63a coaxially surrounded by the second clutch outer 62, a plurality of third friction plates 64 that are engaged with the second clutch outer 62 in a relatively non-rotatable manner, a plurality of fourth friction plates 65 that are engaged with the second cylinder portion 63a of the second clutch inner 63 in a relatively non-rotatable manner and are arranged alternately with respect to the third friction plates 64, a pressure receiving plate 66 engaged with the second cylinder portion 63a in a relatively non-rotatable manner while being opposed to, from among the third and fourth friction plates 64, 65 that are arranged in a mutually overlapping manner, the friction plate (in this embodiment, the third friction plate 64) arranged at the driving rotary member 38 side end, and a pressing ring 67 for compressing the third and fourth friction plates 64, 65 between the pressing ring 67 and the pressure receiving plate 66. A snap ring 68, which abuts on and engages with the inner periphery of the pressure receiving plate 66 from the side opposite to the third and fourth friction plates 64, 65, is mounted onto the second cylinder portion 63a.

The second clutch outer 62 is provided integrally continuous to the driving rotary member 38, and the first clutch outer 55 of the first clutch actuating mechanism 51 is provided continuous to the second clutch outer 62 in a coaxial and integral manner. That is, the driving rotary member 38, the first clutch outer 55, and the second clutch outer 62 are formed in the shape of a bottomed cylinder with the driving rotary member 38 serving as the end wall.

Further, the second connecting plate portion 63b of the second clutch inner 63 projects radially inward from the axially intermediate portion of the inner periphery of the second cylinder portion 63a. The inner peripheral portion of the second connecting plate portion 63b is connected to the second main shaft 8 in a relatively non-rotatable manner while keeping its relative axial position constant.

The first clutch disconnection/connection control mechanism 53 includes a first piston 72 with a back surface that faces to a first hydraulic pressure chamber 71 so that the first piston 72 is actuated to advance in the direction for compressing the plurality of first and second friction plates 57, 58, which are equipped in the first clutch actuating mechanism 51, in accordance with an increase in the hydraulic pressure of the first hydraulic pressure chamber 71, and a first clutch spring 74 serving as an urging member accommodated in a first urging-member accommodating chamber 73, to which the front surface of the first piston 72 faces, and adapted to urge the first piston 72 in the retracting direction.

The first hydraulic pressure chamber 71 is formed by the first cylinder member 26, an end wall member 79 fitted onto the outer periphery of the first cylinder member 26 in a fluid-tight manner, and the first piston 72. A snap ring 80, which abuts on and engages with the inner peripheral portion of the end wall member 79 from the side opposite to the first hydraulic pressure chamber 71, is mounted onto the outer periphery of the first cylinder member 26. Further, the first piston 72 is formed in a ring-like configuration integrally by a cylindrical first fitting tube portion 72a with which the outer periphery of the first cylinder member 26 being brought into fitting engagement in a fluid-tight manner. A cylindrical second fitting tube portion 72b with which the outer periphery of the end wall member 79 is also brought into fitting engagement in a fluid-tight manner. Further, a cylindrical third fitting tube portion 72c is brought into fitting engagement with the first cylinder portion 56a of the first clutch inner 56 in a fluid-tight manner. The inner diameter of the second fitting tube portion 72b is set to be substantially the same as the inner diameter of the first cylinder portion 56a in the first clutch inner 56 of the first clutch actuating mechanism 51. The first hydraulic pressure chamber 71 is arranged radially inward with respect to the first cylinder portion 56a of the first clutch inner 56.

Further, the first urging-member accommodating chamber 73 is formed by the first cylinder member 26, the first piston 72, and the first clutch inner 56. The outer periphery of the first urging-member accommodating chamber 73 is defined by the inner periphery of the first cylinder portion 56a of the first clutch inner 56, and the third fitting tube portion 72c that is brought into fitting engagement with the first cylinder portion 56a in a fluid-tight manner. The first urging-member accommodating chamber 73 is also arranged radially inward with respect to the first cylinder portion 56a of the first clutch inner 56.

Further, the pressing ring 60 of the first clutch actuating mechanism 51 is provided integrally continuous to the outer periphery of the first piston 72. When the first piston 71 advances in the direction for increasing the volume of the first hydraulic pressure chamber 71 through hydraulic action on the first hydraulic pressure chamber 71, the first and second friction plates 57, 58 are compressed between the pressure receiving plate 59 and the pressing ring 60. Due to the frictional engagement between the first and second friction plates 57, 58, power is transmitted between the first clutch outer 55 and the first clutch inner 56, that is, between the driving rotary member 38 and the first main shaft 7.

In the state wherein the hydraulic pressure in the first hydraulic pressure chamber 71 is released, the first piston 72 has moved in the direction for reducing the volume of the first hydraulic pressure chamber 71 due to the spring force of the first clutch spring 74. In this state, the first and second friction plates 57, 58 are not in frictional engagement with each other, so the power transmission between the driving rotary member 38 and the first main shaft 7 is cut off.

The second clutch disconnection/connection control mechanism 54 includes a second piston 76 with a back surface that is faced to a second hydraulic pressure chamber 75 so that the second piston 76 is actuated to advance in the direction for compressing the plurality of third friction plates 64 and the plurality of fourth friction plates 65, which are equipped in the second clutch actuating mechanism 52, in accordance with an increase in the hydraulic pressure of the second hydraulic pressure chamber 75, and a second clutch spring 78 serving as an urging member accommodated in a second urging-member accommodating chamber 77, to which the front surface of the second piston 76 is faced, and adapted to urge the second piston 76 in the retracting direction.

The second hydraulic pressure chamber 77 is formed by a second cylinder member 81, which is engaged with the second connecting plate portion 63b of the second clutch inner 63 while keeping a constant axial position relative to the second main shaft 8 and is fitted on the outer periphery of the second main shaft 8, a disc-shaped end wall portion 81a that is integrally continuous to the second cylinder member 81 on the first clutch actuating mechanism 51 side so as to project radially outward, and the second piston 76. The second piston 76 is formed in a ring plate-like configuration integrally having a cylindrical third fitting tube portion 76a wherein the outer periphery of the second cylinder member 81 is brought into fitting engagement in a fluid-tight manner, and a cylindrical fourth fitting tube portion 76b wherein the outer periphery of the end wall portion 81a is brought into fitting engagement in a fluid-tight manner.

In addition, the pressing ring 67 of the second clutch actuating mechanism 52 is provided integrally continuous to the outer periphery of the second piston 76 while being formed in the shape of a cylinder that extends from the outer periphery of the second piston 76 in the direction opposite to the fourth fitting tube portion 76b. The second urging-member accommodating chamber 77 is formed by the second cylinder member 81, the second piston 76, an end wall member 82 fitted on the outer periphery of the second cylinder member 81 and is brought into fitting engagement the pressing ring 67 in a fluid-tight manner, and the pressing ring 67. A snap ring 83, which abuts on and engages with the inner periphery of the end wall member 82 from the side opposite to the second urging-member accommodating chamber 77, is mounted onto the second cylinder member 81.

In this way, the second clutch disconnection/connection control mechanism 54 is arranged between the first and second clutch inners 56, 63 so that at least a part of the second clutch disconnection/connection control mechanism 54 is accommodated in at least one of the first and second cylinder portions 56a, 63a respectively equipped to the first and second clutch inners 56, 63. In this embodiment, the second clutch disconnection/connection control mechanism 54 is arranged between the first and second clutch inners 56, 63 so that a part of the second cylinder member 81, which is equipped to the second clutch disconnection/connection control mechanism 54, on the second clutch actuating mechanism 52 side is accommodated within the first cylinder member 56a. In addition, a part of the second cylinder member 81 on the second clutch actuating mechanism 52 side and a part of the end wall member 82 are accommodated within the second cylinder portion 63a.

When the second piston 76 advances in the direction for increasing the volume of the second hydraulic pressure chamber 75 through hydraulic action on the second hydraulic pressure chamber 75, the third and fourth friction plates 64, 65 are compressed between the pressure receiving plate 66 and the pressing ring 67, and due to the frictional engagement between the third and fourth friction plates 64, 65, power is transmitted between the second clutch outer 62 and the second clutch inner 63, that is, between the driving rotary member 38 and the second main shaft 8.

Further, in the state wherein the hydraulic pressure in the second hydraulic pressure chamber 75 is released, the second piston 76 has moved in the direction for reducing the volume of the second hydraulic pressure chamber 75 due to the spring force of the second clutch spring 78. In this state, the third and fourth friction plates 64, 65 are not in frictional engagement with each other, so the power transmission between the driving rotary member 38 and the second main shaft 8 is cut off.

In addition, the first cylinder member 26 is spline-fitted to one end portion of the first main shaft 7. A snap ring 84 that abuts on and engages with the inner end of the first cylinder member 26 is fitted onto the outer periphery of the first main shaft 7. A cap 86 having at its central portion a through hole 85, through which one end of the first main shaft 7 is passed, is fitted to the outer end portion of the first cylinder member 26. Further, a nut 87 that abuts on the cap 86 is brought into threaded engagement with the one end of the first main shaft 7 extending from the cap 86. By fastening the nut 87, the first cylinder member 26 and the cap 86 are fixed to the first main shaft 7.

On the other hand, in the cover 24 coupled to the crankcase 5, a fitting hole 88 with which the cap 86 is brought into fitting engagement is provided coaxially to the first main shaft 7. A stepped portion 89 facing outward is formed on the outer side with respect to the fitting engagement portion of the cap 86 and at the intermediate portion of the fitting hole 88. A disc-like partition wall member 90 is fitted in the fitting hole 88 in a fluid-tight manner so that its outer peripheral portion abuts against the stepped portion 89. A lid member 91, which is positioned outward with respect to the partition wall member 90 and fitted in the fitting hole 88 in a fluid-tight manner, is attached to the cover 24 by means of a plurality of bolts 92.

In the main shaft 7, a bottomed hole 93 with its closed end substantially corresponding to the second clutch disconnection/connection control mechanism 54 is provided coaxially from one end side. In the bottomed hole 93, a cylindrical tube member 94 with its inner end substantially corresponding to the first clutch disconnection/connection control mechanism 53 is inserted coaxially, and an annular seal member 95 is sandwiched between the outer periphery of the inner end of the cylindrical tube member 94 and the inner periphery of the bottomed hole 93. Accordingly, within the first main shaft 7, an annular first hydraulic pressure passage 96, which extends to a position substantially corresponding to the first clutch disconnection/connection control mechanism 53, is formed between the first main shaft 7 and the tube member 94, and a second hydraulic pressure passage 97 that extends to a position substantially corresponding to the second clutch disconnection/connection control mechanism 54 is formed by the portion of the bottomed hole 93 located close to the inner end and the tube member 94. That is, the first and second hydraulic pressure passages 96, 97 are provided coaxially within the first main shaft 7 that is a shaft penetrating the first and second clutch disconnection/connection control mechanisms 53, 54.

The first hydraulic pressure passage 96 communicates with a first hydraulic pressure supplying chamber 98 formed between the cap 86 and the partition wall member 90 and within the fitting hole 88. The cover 24 is provided with a passage 99 that connects the first hydraulic pressure supplying chamber 98 to hydraulic pressure control means (not shown).

Further, in the first main shaft 7 and the first cylinder member 26, a first communication passage 100 that communicates the first hydraulic pressure passage 96 with the first hydraulic pressure chamber 71 is formed so that both sides of the communication passage 100 are sealed between the main shaft 7 and the first cylinder member 26. That is, hydraulic pressure is exerted on the first hydraulic pressure chamber 71 via the first hydraulic pressure passage 96 and the first communication passage 100 from the first hydraulic pressure supplying chamber 98.

A recess 104 is provided at the center portion of the inner surface of the lid member 91. The outer end of the tube member 94 penetrates the partition wall member 90 in a fluid-tight manner to be fitted in the recess 104. In addition, an annular seal member 105 that surrounds the tube member 94 is sandwiched between the partition wall member 90 and the lid member 91. A second hydraulic pressure supplying chamber 103 communicating with the recess 104 is formed in an annular shape surrounding the seal member 105, between the partition wall member 90 and the lid member 91 and within the fitting hole 88. The cover 24 is provided with a passage 106 that connects the second hydraulic pressure supplying chamber 103 to hydraulic pressure control means (not shown).

Further, in the first main shaft 7, the second main shaft 8, and the second cylinder member 81, a second communication passage 107 that communicates the second hydraulic pressure passage 97 with the second hydraulic pressure chamber 75 is formed so that both sides of the second communication passage 107 are sealed between the first and second main shafts 7 and 8 and between the second main shaft 8 and the second cylinder member 81. That is, hydraulic pressure is exerted on the second hydraulic pressure chamber 75 via the second hydraulic pressure passage 97 and the second communication passage 107 from the second hydraulic pressure supplying chamber 103.

In this way, within the first main shaft 7, the first hydraulic pressure passage 96 that communicates with the first hydraulic pressure supplying chamber 98 and the first hydraulic pressure chamber 71, and the second hydraulic pressure passage 97 that communicates with the second hydraulic pressure supplying chamber 103 and the second hydraulic pressure chamber 75 are provided coaxially so as to be independent from each other.

The first cylinder member 26 as an accommodating-chamber forming member, at least a part of which faces to the first urging-member accommodating chamber 73 of the first clutch disconnection/connection control mechanism 53, is provided with a plurality of oil passages 112 for introducing oil to the first urging-member accommodating chamber 73. The oil passages 112 communicate with the inner ends of a plurality of passages 113 that are provided in the first cylinder member 26 so as to extend along its axis. Further, throttle members 114 are fitted to the outer end portions of the respective passages 113. An oil supply passage 115, which communicates with the passages 113 via the throttle members 114, is provided in the second cylinder member 81, the cap 86, and the cover 24.

In the first clutch disconnection/connection control mechanism 53, the end wall member 79 and the first piston 72 rotate together with the first clutch inner 56, and a centrifugal force is exerted on the oil in the first hydraulic pressure chamber 71. In this regard, since oil is also supplied to the first urging-member accommodating chamber 73 located opposite to the first hydraulic pressure chamber 71 with respect to the first piston 72, the centrifugal force exerted on the oil in the first hydraulic pressure chamber 71 is cancelled out by the centrifugal force exerted on the oil in the first urging-member accommodating chamber 73.

Further, in the first cylinder member 26, an oil discharge passage 116 for discharging oil to the outside from the first urging-member accommodating chamber 73 is provided so as to be directed toward the second clutch disconnection/connection control mechanism 54 side. The oil released from the oil discharge passage 116 is scattered to the first cylinder portion 56a side of the first clutch inner 56 in the first clutch actuating mechanism 51. The first cylinder portion 56a is provided with a plurality of oil introducing holes 121 for introducing the oil discharged from the oil discharge passage 116 and scattered, to the outer periphery side.

The second cylinder member 81 as an accommodating-chamber forming member, at least a part of which faces to the second urging-member accommodating chamber 77 of the second clutch disconnection/connection control mechanism 54, is provided with a plurality of oil passages 117 for introducing oil to the second urging-member accommodating chamber 77. On the other hand, the first main shaft 7 is coaxially provided with a bottomed passage 118 having a closed end at a position substantially corresponding to the second clutch disconnection/connection control mechanism 54. A passage 119 that communicates the passage 118 with the oil passages 117 is formed in the first main shaft 7, the second main shaft 8, and the second cylinder member 81.

In the second clutch disconnection/connection control mechanism 54, the second cylinder member 81 and the second piston 76 rotate together with the second main shaft 8, and a centrifugal force is exerted on the oil in the second hydraulic pressure chamber 75. In this regard, since oil is also supplied to the second urging-member accommodating chamber 77 located opposite to the second hydraulic pressure chamber 75 with respect to the second piston 76, the centrifugal force exerted on the oil in the second hydraulic pressure chamber 75 is cancelled out by the centrifugal force exerted on the oil in the second urging-member accommodating chamber 77.

Further, in the second cylinder member 81, an oil discharge passage 120 for discharging oil to the outside from the second urging-member accommodating chamber 77 is provided so as to be directed toward the second connecting plate portion 63b side of the second clutch inner 63. The oil released from the oil discharge passage 120 is scattered to the second cylinder portion 63a side of the second clutch inner 63. The second cylinder portion 63a is provided with a plurality of oil introducing holes 122 for introducing the oil discharged from the oil discharge passage 120 and scattered, to the inner periphery side.

Next, the operation according to the above-described first embodiment will be described. The first and second clutch actuating mechanisms 51, 52 are arranged in parallel along the axes of the first and second main shafts 7, 8 that are coaxial. The second clutch disconnection/connection control mechanism 54, which exerts on the second clutch actuating mechanism 52 a controlling force for switching the disconnection/connection of the second clutch actuating mechanism 52, is arranged between the first and second clutch inners 56, 63 so that at least a part of the second clutch disconnection/connection control mechanism 54 is accommodated in at least one of the first and second cylinder portions 56a, 63a equipped to the first and second clutch inners 56, 63 of the first and second clutch actuating mechanisms 51, 52, respectively.

Accordingly, the second clutch disconnection/connection control mechanism 54 can be arranged by effectively utilizing the dead space between the first and second cylinder portions 56a, 63a, and the first and second main shafts 7, 8, thereby making the two-clutch device 39 compact with respect to the axial direction.

Further, the first clutch disconnection/connection control mechanism 53 includes the first piston 72 with a back surface that faces to the first hydraulic pressure chamber 71 so that the first piston 72 is actuated to advance in the direction for compressing the plurality of first and second friction plates 57, 58, which are equipped to the first clutch actuating mechanism 51 and arranged in an alternately overlapping manner, in accordance with an increase in the hydraulic pressure of the first hydraulic pressure chamber 71, and the first clutch spring 74 accommodated in the first urging-member accommodating chamber 73, to which the front surface of the first piston 72 is faced, and adapted to urge the first piston 72 in the retracting direction. Since the first hydraulic pressure chamber 71 and the first urging-member accommodating chamber 73 are arranged radially inwardly with respect to the first cylinder portion 56a of the first clutch inner 56 equipped to the first clutch actuating mechanism 51 that is arranged axially outwardly with respect to the second clutch actuating mechanism 52, the twin-clutch device 39 can be made more compact with respect to the axial direction.

In the case of a small-sized vehicle such as a motorcycle, in particular, the reduced size of the twin-clutch device 39 in the axial direction leads to enhanced freedom of layout of other auxiliaries, and in the case of a motorcycle, this proves effective because the twin-clutch device 39 does not become a factor in inhibiting the setting of a banking angle.

Further, the second clutch disconnection/connection control mechanism 54 includes the second piston 76 with a back surface that faces to the second hydraulic pressure chamber 75 so that the second piston 76 is actuated to advance in the direction for compressing the plurality of third and fourth friction plates 64, 65, which are equipped to the second clutch actuating mechanism 52 and arranged in an alternately overlapping manner, in accordance with an increase in the hydraulic pressure of the second hydraulic pressure chamber 75, and the second clutch spring 78 accommodated in the second urging-member accommodating chamber 77, to which the front surface of the second piston 76 faces, and is adapted to urge the second piston 76 in the retracting direction. The oil passages 112, 117 for introducing oil to the first and second urging-member accommodating chambers 73, 77 are provided in the first and second cylinder members 26, 81 that at least partially face to the first and second urging-member accommodating chambers 73, 77, respectively. Accordingly, the centrifugal force exerted on the oil supplied into the first and second hydraulic pressure chambers 71, 75 is cancelled out by the oil supplied into the first and second urging-member accommodating chambers 73, 77 from the oil passages 112, 117.

Further, the first and second cylinder members 26, 81 are provided with the oil discharge passages 116, 120 for discharging oil from the first and second urging-member accommodating chambers 73, 77, and the oil discharged from the first and second urging-member accommodating chambers 73, 77 can be used as the lubricating oil for the first and second clutch actuating mechanisms 51, 52. Accordingly, the provision of dedicated oil passages for the lubrication of the first and second clutch actuating mechanisms 51, 52 becomes unnecessary, thereby making it possible to reduce the number of machining man-hours.

Further, the first and second hydraulic pressure passages 96, 97 for exerting hydraulic pressures on the first and second hydraulic pressure chambers 71, 75 equipped in the first and second clutch disconnection/connection control mechanisms 53, 54 in a mutually independent manner are provided coaxially within the first main shaft 7 penetrating the first and second clutch disconnection/connection control mechanisms 53, 54, thereby making it possible to simplify the structure of the hydraulic pressure passages for exerting hydraulic pressures on the first and second hydraulic pressure chambers 71, 75.

Furthermore, the clutch outers 55, 62 respectively equipped to the first and second clutch actuating mechanisms 51, 52 are coupled in a coaxial and integral manner, whereby the clutch outer can be shared between the first and second clutch actuating mechanisms 51, 52 to thereby reduce the number of parts.

Figure 3:
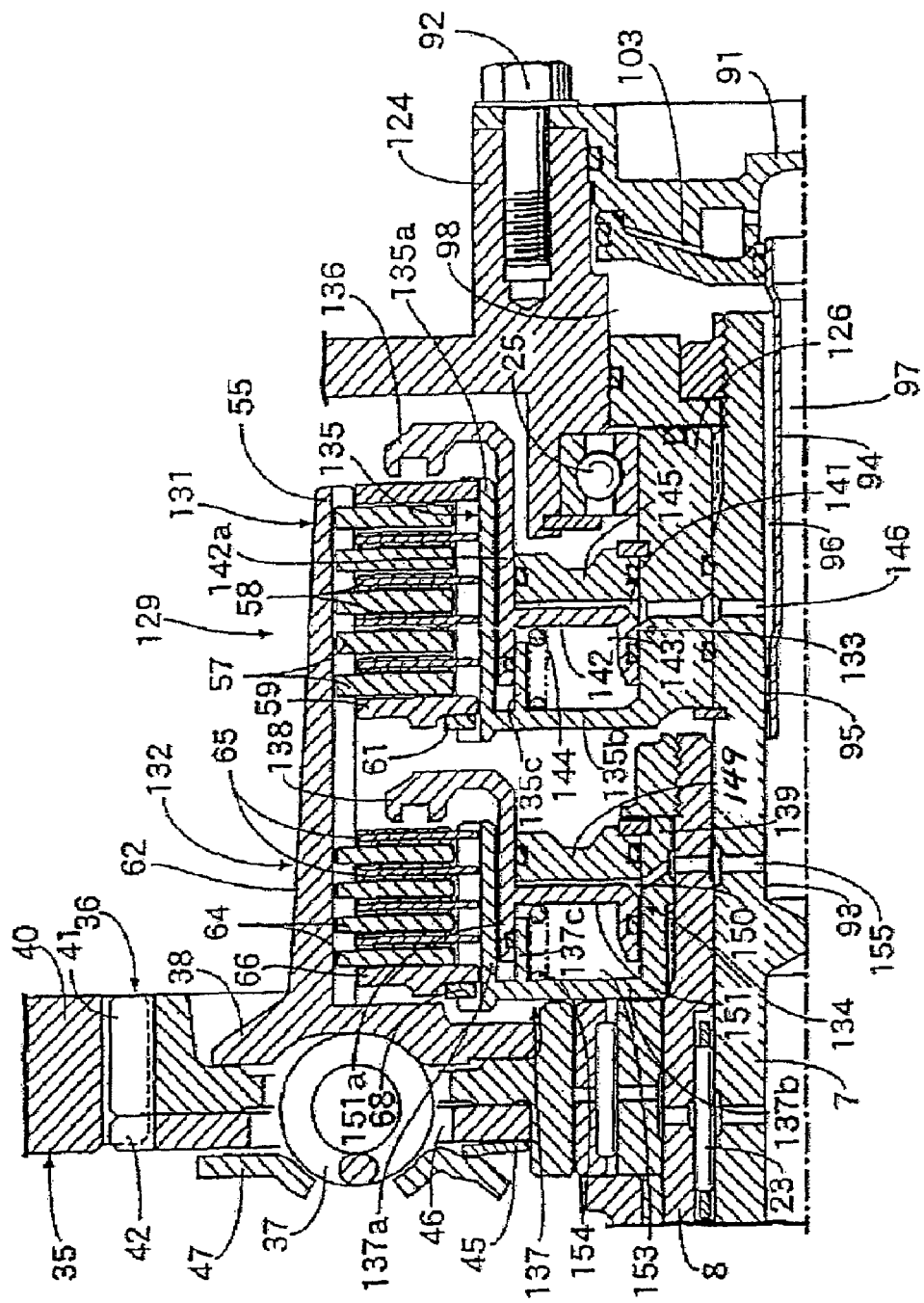
FIG. 3 is a longitudinal sectional view of the main portion of a twin-clutch device according to a second embodiment of the present invention.

FIG. 3 shows a second embodiment of the present invention. The portions corresponding to those of the first embodiment shown in FIGS. 1 and 2 are simply denoted by the same reference numerals and detailed description thereof is omitted.

A first cylinder member 126 is fitted and fixed to one end portion of the first main shaft 7 that penetrates the second main shaft 8 in a relatively rotatable manner while keeping a constant axial position relative to the second main shaft 8. A ball bearing 125 is interposed between the first cylinder member 126 and a cover 124 that is coupled to the crankcase 5 (see the first embodiment).

The power of the crankshaft 35 is input to the driving rotary member 38 via the primary speed reducer 36 and the damper spring 37. A twin-clutch device 129 according to the present invention is provided between the driving rotary member 38 and each of the first main shaft 7 as the first driven shaft and the second main shaft 8 as the second driven shaft.

The twin-clutch device 129 includes a first clutch actuating mechanism 131 provided between the driving rotary member 38 and the first main shaft 7, a second clutch actuating mechanism 132 provided between the driving rotary member 38 and the second main shaft 8, a first clutch disconnection/connection control mechanism 133 for exerting on the first clutch actuating mechanism 131 a controlling force for switching disconnection/connection of the first clutch actuating mechanism 131, and a second clutch disconnection/connection control mechanism 134 for exerting on the second clutch actuating mechanism 132 a controlling force for switching disconnection/connection of the second clutch actuating mechanism 132. The first and second clutch actuating mechanisms 131, 132 are arranged in parallel along the axial direction of the first and second main shafts 7, 8 that are coaxial, with the first clutch actuating mechanism 131 being located on the outer side.

The first clutch actuating mechanism 131 includes the first clutch outer 55 that is continuous to the driving rotary member 38, a first clutch inner 135 having a ring-like first connecting plate portion 135b that is integrally continuous to a first cylinder portion 135a coaxially surrounded by the first clutch outer 55, the plurality of first friction plates 57 that are engaged with the first clutch outer 55 in a relatively non-rotatable manner, the plurality of second friction plates 58 that are engaged with the first cylinder portion 135a of the first clutch inner 135 in a relatively non-rotatable manner and are arranged alternately with respect to the first friction plates 57, the pressure receiving plate 59 engaged with the first cylinder portion 135a in a relatively non-rotatable manner while being opposed to, from among the first and second friction plates 57, 58 that are arranged in a mutually overlapping manner, the friction plate (in this embodiment, the first friction plate 57) arranged at the driving rotary member 38 side end, and a pressing ring 136 for compressing the first and second friction plates 57, 58 between the pressing ring 136 and the pressure receiving plate 59. The snap ring 61, which abuts on and engages with the inner periphery of the pressure receiving plate 59 from the side opposite to the first and second friction plates 57, 58, is mounted onto the first cylinder portion 135a.

The first connecting plate portion 135b of the first clutch inner 135 projects radially inward from the inner end of the first cylinder portion 135a. The inner peripheral portion of the first connecting plate portion 135b is provided integrally continuous to the inner end of the first cylinder member 126 that is fitted and fixed onto the first main shaft 7. That is, the first clutch inner 135 is formed integrally with the first cylinder member 126, and the first connecting plate portion 135b is connected to the first main shaft 7 via the first cylinder member 126 in a relatively non-rotatable manner.

The second clutch actuating mechanism 132 is arranged between the first clutch actuating mechanism 131 and the driving rotary member 38. The second clutch actuating mechanism 132 includes the second clutch outer 62 that is integrally continuous to the first clutch outer 55 and is integrally continuous to the driving rotary member 38, a second clutch inner 137 having a ring-like second connecting plate portion 137b that is integrally continuous to the inner periphery of a second cylinder portion 137a coaxially surrounded by the second clutch outer 62, the plurality of third friction plates 64 that are engaged with the second clutch outer 62 in a relatively non-rotatable manner, the plurality of fourth friction plates 65 that are engaged with the second cylinder portion 137a of the second clutch inner 137 in a relatively non-rotatable manner and are arranged alternately with respect to the third friction plates 64, the pressure receiving plate 66 engaged with the second cylinder portion 137a in a relatively non-rotatable manner while being opposed to, from among the third and fourth friction plates 64, 65 that are arranged in a mutually overlapping manner, the friction plate (in this embodiment, the third friction plate 64) arranged at the driving rotary member 38 side end, and a pressing ring 138 for compressing the third and fourth friction plates 64, 65 between the pressing ring 138 and the pressure receiving plate 66. The snap ring 68, which abuts on and engages with the inner periphery of the pressure receiving plate 66 from the side opposite to the third and fourth friction plates 64, 65, is mounted onto the second cylinder portion 137a.

A second cylinder member 139 coaxially surrounding the second main shaft 8 is fixed to the second main shaft 8. Further, the second connecting plate portion 137b of the second clutch inner 137 projects radially inward from the inner end of the second cylinder portion 137a. The inner peripheral portion of the second connecting plate portion 137b is provided integrally continuous to the inner end of the second cylinder member 139. That is, the second clutch inner 137 is formed integrally with the second cylinder member 139, and the second clutch inner 137 is connected to the second main shaft 8 via the second cylinder member 139.

A first clutch disconnection/connection control mechanism 133 includes a first piston 142 whose back surface faces to a first hydraulic pressure chamber 141 so that the first piston 142 is actuated to advance in the direction for compressing the plurality of first and second friction plates 57, 58, which are equipped in the first clutch actuating mechanism 131, in accordance with an increase in the hydraulic pressure of the first hydraulic pressure chamber 141, and a first clutch spring 144 serving as an urging member accommodated in a first urging-member accommodating chamber 143, to which the front surface of the first piston 142 faces, and adapted to urge the first piston 142 in the retracting direction.

The first hydraulic pressure chamber 141 is formed by the first cylinder member 126, an end wall member 145 whose movement in the direction away from the first piston 142 is restricted and which is fitted onto the outer periphery of the first cylinder member 126 in a fluid-tight manner at a position opposed to the first piston 142, and the first piston 142 having the first cylinder member 126 brought into fitting engagement with the inner periphery thereof. The first piston 142 is integrally provided with a cylinder portion 142a, which is arranged radially inward with respect to the first cylinder portion 135a and with which the outer periphery of the end wall member 145 is brought into fitting engagement in a fluid-tight manner. The cylinder portion 142a is provided integrally continuous to a pressing ring 136. That is, the first piston 142 and the pressing ring 136 are formed integrally with each other.

Further, the first urging-member accommodating chamber 143 is formed by the first cylinder member 126, the first piston 142, and the first connecting plate portion 135b of the first clutch inner 135. A fitting tube portion 135c that is fitted in the cylinder portion 142a in a fluid-tight manner integrally projects from the first connecting plate portion 135b.

In the first clutch disconnection/connection control mechanism 133 as described above, the cylinder portion 142a that is integral with the first piston 142 and the pressing ring 136 is formed to be smaller in diameter than the first cylinder portion 135a of the first clutch inner 135, and the first clutch disconnection/connection control mechanism 133 is arranged radially inwardly with respect to the first cylinder portion 135a of the first clutch inner 135.

The first hydraulic pressure passage 96 formed within the first main shaft 7 communicates with the first hydraulic pressure chamber 141 via a first communication passage 146 formed in the first main shaft 7 and the first cylinder member 126.

The second clutch disconnection/connection control mechanism 134 includes a second piston 151 whose back surface is faced to a second hydraulic pressure chamber 150 so that the second piston 151 is actuated to advance in the direction for compressing the plurality of third and fourth friction plates 64, 65, which are equipped in the second clutch actuating mechanism 132, in accordance with an increase in the hydraulic pressure of the second hydraulic pressure chamber 150. A second clutch spring 154 serve as an urging member accommodated in a second urging-member accommodating chamber 153, to which the front surface of the second piston 151 faces, and is adapted to urge the second piston 151 in the retracting direction.

The second hydraulic pressure chamber 150 is formed by the second cylinder member 139, an end wall member 149 whose movement in the direction away from the second piston 151 is restricted and which is fitted onto the outer periphery of the second cylinder member 139 in a fluid-tight manner at a position opposed to the second piston 151. The second piston 151 includes the second cylinder member 139 brought into fitting engagement with the inner periphery thereof. The second piston 151 is integrally provided with a cylinder portion 151a, which is arranged radially inwardly with respect to the second cylinder portion 137a and with which the outer periphery of the end wall member 149 is brought into fitting engagement in a fluid-tight manner. The cylinder portion 151a is provided continuously integrally to the pressing ring 138. That is, the second piston 151 and the pressing ring 138 are formed integrally with each other.

Further, the second urging-member accommodating chamber 153 is formed by the second cylinder member 139, the second piston 151, and the second connecting plate portion 137b of the second clutch inner 137. A fitting tube portion 137c that is fitted in the cylinder portion 151a in a fluid-tight manner integrally protrudes from the second connecting plate portion 137b.

In the second clutch disconnection/connection control mechanism 134 as described above, the cylinder portion 151a that is integral with the second piston 151 and the pressing ring 138 is formed to be smaller in diameter than the second cylinder portion 137a of the second clutch inner 137, and the second clutch disconnection/connection control mechanism 134 is arranged radially inwardly with respect to the second cylinder portion 137a of the second clutch inner 137.

The second hydraulic pressure passage 97 formed within the first main shaft 7 communicates with the first hydraulic pressure chamber 141 via a second communication passage 155 formed in the first main shaft 7, the second main shaft 8, and the second cylinder member 139.

According to the second embodiment as described above, the first and second clutch disconnection/connection control mechanisms 133, 134 are arranged radially inwardly with respect to the first and second cylinder portions 135a, 137a of the first and second clutch inners 135, 137 respectively equipped to the first and second clutch actuating mechanisms 131, 132 arranged in parallel along the axes of the first and second main shafts 7, 8 that are coaxial. Accordingly, the first and second clutch disconnection/connection control mechanisms 133, 134 can be arranged by effectively utilizing the dead space between the first and second cylinder portions 135a, 137a, and the first and second main shafts 7, 8, whereby the twin-clutch device 129 can be made more compact with respect to the axial direction. In addition, the inertial mass of the twin-clutch device 129 can be reduced, thus allowing power from the drive source to be transmitted without causing a decrease in responsiveness.

Further, at the time of changing gears, the disconnection/connection states of the first and second clutch actuating mechanisms 131, 132 are alternately changed, and the establishing states of the first to fourth-speed gear trains G1 to G4 in the transmission 6 are sequentially changed through the movement of the first and second shifters 18, 19. For example, when changing the first gear, the first clutch actuating mechanism 131 is in the connected state, whereas the second clutch actuating mechanism 132 is in the disconnected state. At this time, to change from the first gear to the second gear, the second shifter 19 is moved in the direction for engagement with the second-speed driven gear 13. At this time, while the second shifter 19 is rotating together with the countershaft 9, since the second clutch actuating mechanism 132 is in the disconnected state, the second-speed driven gear 13 is in the dragging state following the rotation of the first clutch actuating mechanism 131, so a difference in RPM occurs between the second shifter 19 and the second-speed driven gear 13. Accordingly, if the inertial mass of the second clutch actuating mechanism 132 is large, the amount of energy generated upon the engagement of the second shifter 19 with the second-speed driven gear 13 is large, causing a shift shock. In this regard, since the weight of the rotary portion in the twin-clutch device 129 is reduced to thereby reduce the inertial mass as described above, the shift shock resulting from the movement of the first and second shifters 18, 19 can be reduced.

While in the above-described embodiments the first clutch outer 55 and the second clutch outer 62 are formed integrally and shared between the first and second clutch actuating mechanisms 51, 131; 52, 132. In addition, the present invention is also applicable to a twin-clutch device of a construction in which, as disclosed in JP-A No. H08-277852, the clutch outers of the first and second clutch actuating mechanisms are of a dual structure consisting of inner and outer ones.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A twin-clutch device comprising:
a first clutch actuating mechanism including a first clutch outer that is continuous to a driving rotary member, and a first clutch inner having a first cylinder portion coupled to a first driven shaft in a relatively non-rotatable manner;
a second clutch actuating mechanism including a second clutch outer that is continuous to the driving rotary member, and a second clutch inner having a second cylinder portion coupled to a second driven shaft in a relatively non-rotatable manner;
a first clutch disconnection/connection control mechanism for exerting on the first clutch actuating mechanism a controlling force for switching disconnection/connection of the first clutch actuating mechanism; and
a second clutch disconnection/connection control mechanism for exerting on the second clutch actuating mechanism a controlling force for switching disconnection/connection of the second clutch actuating mechanism;
said first and second clutch actuating mechanisms being arranged in parallel along axes of the first and second driven shafts that are coaxial;
wherein the second clutch disconnection/connection control mechanism is arranged between the first and second clutch inners so that at least a part of the second clutch disconnection/connection control mechanism is accommodated in the first cylinder portion.

2. The twin-clutch device according to claim 1, wherein:
the first clutch disconnection/connection control mechanism includes a piston and an urging member, the piston having its back surface exposed to a hydraulic pressure chamber so that the piston is actuated to advance in a direction for compressing a plurality of first and second friction plates, which are provided in the first clutch actuating mechanism so as to be arranged in a mutually overlapping manner, in accordance with an increase in hydraulic pressure in the hydraulic pressure chamber, the urging member being accommodated in an urging-member accommodating chamber, to which a front surface of the piston is exposed, and urging the piston in a retracting direction; and
the hydraulic pressure chamber and the urging-member accommodating chamber are arranged radially inwardly with respect to the first cylinder portion of the first clutch inner provided to the first clutch actuating mechanism that is arranged axially outward with respect to the second clutch actuating mechanism.

3. The twin-clutch device according to claim 2, wherein the first and second clutch outers are coupled together coaxially and integrally.

4. The twin-clutch device according to claim 2, wherein first and second hydraulic pressure passages for exerting hydraulic pressures on the hydraulic pressure chambers of the first and second clutch disconnection/connection control mechanisms in a mutually independent manner are provided coaxially within the first driven shaft that penetrates the first and second clutch disconnection/connection control mechanisms.

5. The twin-clutch device according to claim 1, wherein the first and second clutch outers are coupled together coaxially and integrally.

6. The twin-clutch device according to claim 1, wherein:
the first and second clutch disconnection/connection control mechanisms each include a piston and an urging member, the piston having its back surface exposed to a hydraulic pressure chamber wherein the piston is actuated to advance in a direction for compressing a plurality of friction plates, which are respectively provided in the first and second clutch actuating mechanisms so as to be arranged in a mutually overlapping manner, in accordance with an increase in hydraulic pressure in the hydraulic pressure chamber, the urging member being accommodated in an urging-member accommodating chamber, to which a front surface of the piston is exposed, and urging the piston in a retracting direction; and an oil passage for introducing oil to the urging-member accommodating chamber to cancel a centrifugal force exerted on oil supplied to the hydraulic pressure chamber and an oil discharge passage for discharging oil to the outside from the urging-member accommodating chamber are provided in an accommodating-chamber forming member having at least a part thereof faced to the urging-member accommodating chamber.

7. The twin-clutch device according to claim 6, wherein first and second hydraulic pressure passages for exerting hydraulic pressures on the hydraulic pressure chambers of the first and second clutch disconnection/connection control mechanisms in a mutually independent manner are provided coaxially within the first driven shaft that penetrates the first and second clutch disconnection/connection control mechanisms.

8. A twin-clutch device comprising:
a first clutch actuating mechanism including a first clutch outer that is continuous to a driving rotary member, and a first clutch inner having a first cylinder portion coupled to a first driven shaft in a relatively non-rotatable manner;
a second clutch actuating mechanism including a second clutch outer that is continuous to the driving rotary member, and a second clutch inner having a second cylinder portion coupled to a second driven shaft in a relatively non-rotatable manner;
a first clutch disconnection/connection control mechanism for exerting on the first clutch actuating mechanism a controlling force for switching disconnection/connection of the first clutch actuating mechanism; and
a second clutch disconnection/connection control mechanism for exerting on the second clutch actuating mechanism a controlling force for switching disconnection/connection of the second clutch actuating mechanism;
the first and second clutch actuating mechanisms being arranged in parallel along axes of the first and second driven shafts that are coaxial;
wherein each of the first and second clutch disconnection/connection control mechanisms includes a cylinder portion having an outer circumferential surface that fits against an inner circumferential surface the corresponding first and second cylinder portion.

9. The twin-clutch device according to claim 8, wherein the first and second clutch outers are coupled together coaxially and integrally.

10. A twin-clutch device comprising:
a first clutch actuating mechanism having a first clutch outer continuous formed with a driving rotary member, and a first clutch inner having a first cylinder portion coupled to a first driven shaft in a relatively non-rotatable manner;
a second clutch actuating mechanism having a second clutch outer continuous formed with the driving rotary member, and a second clutch inner having a second cylinder portion coupled to a second driven shaft in a relatively non-rotatable manner;

a first clutch disconnection/connection control mechanism operatively connected to the first clutch actuating mechanism for exerting on the first clutch actuating mechanism a controlling force for switching disconnection/connection of the first clutch actuating mechanism; and
a second clutch disconnection/connection control mechanism operatively connected to the second clutch actuating mechanism for exerting on the second clutch actuating mechanism a controlling force for switching disconnection/connection of the second clutch actuating mechanism;
said first and second clutch actuating mechanisms being arranged in parallel along axes of the first and second driven shafts that are coaxial arranged;
said second clutch disconnection/connection control mechanism being arranged between the first and second clutch inners wherein at least a part of the second clutch disconnection/connection control mechanism is accommodated in the first cylinder portion.

11. The twin-clutch device according to claim 10, wherein:
the first clutch disconnection/connection control mechanism includes a piston and an urging member, the piston having its back surface exposed to a hydraulic pressure chamber so that the piston is actuated to advance in a direction for compressing a plurality of first and second friction plates, which are provided in the first clutch actuating mechanism so as to be arranged in a mutually overlapping manner, in accordance with an increase in hydraulic pressure in the hydraulic pressure chamber, the urging member being accommodated in an urging-member accommodating chamber, to which a front surface of the piston is exposed, and urging the piston in a retracting direction; and
the hydraulic pressure chamber and the urging-member accommodating chamber are arranged radially inwardly with respect to the first cylinder portion of the first clutch inner provided to the first clutch actuating mechanism that is arranged axially outward with respect to the second clutch actuating mechanism.

12. The twin-clutch device according to claim 11, wherein the first and second clutch outers are coupled together coaxially and integrally.

13. The twin-clutch device according to claim 11, wherein first and second hydraulic pressure passages for exerting hydraulic pressures on the hydraulic pressure chambers of the first and second clutch disconnection/connection control mechanisms in a mutually independent manner are provided coaxially within the first driven shaft that penetrates the first and second clutch disconnection/connection control mechanisms.

14. The twin-clutch device according to claim 10, wherein the first and second clutch outers are coupled together coaxially and integrally.

15. The twin-clutch device according to claim 10, wherein:
the first and second clutch disconnection/connection control mechanisms each include a piston and an urging member, the piston having its back surface exposed to a hydraulic pressure chamber wherein the piston is actuated to advance in a direction for compressing a plurality of friction plates, which are respectively provided in the first and second clutch actuating mechanisms so as to be arranged in a mutually overlapping manner, in accordance with an increase in hydraulic pressure in the hydraulic pressure chamber, the urging member being accommodated in an urging-member accommodating chamber, to which a front surface of the piston is exposed, and urging the piston in a retracting direction; and an oil passage for introducing oil to the urging-member accommodating chamber to cancel a centrifugal force exerted on oil supplied to the hydraulic pressure chamber and an oil discharge passage for discharging oil to the outside from the urging-member accommodating chamber are provided in an accommodating-chamber forming member having at least a part thereof faced to the urging-member accommodating chamber.

16. The twin-clutch device according to claim 15, wherein first and second hydraulic pressure passages for exerting hydraulic pressures on the hydraulic pressure chambers of the first and second clutch disconnection/connection control mechanisms in a mutually independent manner are provided coaxially within the first driven shaft that penetrates the first and second clutch disconnection/connection control mechanisms.

17. A twin-clutch device comprising:
a first clutch actuating mechanism including a first clutch outer that is continuous to a driving rotary member, and a first clutch inner having a first cylinder portion coupled to a first driven shaft in a relatively non-rotatable manner;
a second clutch actuating mechanism including a second clutch outer that is continuous to the driving rotary member, and a second clutch inner having a second cylinder portion coupled to a second driven shaft in a relatively non-rotatable manner;
a first clutch disconnection/connection control mechanism for exerting on the first clutch actuating mechanism a controlling force for switching disconnection/connection of the first clutch actuating mechanism; and
a second clutch disconnection/connection control mechanism for exerting on the second clutch actuating mechanism a controlling force for switching disconnection/connection of the second clutch actuating mechanism;
said first and second clutch actuating mechanisms being arranged in parallel along axes of the first and second driven shafts that are coaxial;
wherein the second clutch disconnection/connection control mechanism is arranged between the first and second clutch inners so that at least a part of the second clutch disconnection/connection control mechanism is accommodated in at least one of the first and second cylinder portions, the first clutch disconnection/connection control mechanism includes a piston and an urging member, the piston having its back surface exposed to a hydraulic pressure chamber so that the piston is actuated to advance in a direction for compressing a plurality of first and second friction plates, which are provided in the first clutch actuating mechanism so as to be arranged in a mutually overlapping manner, in accordance with an increase in hydraulic pressure in the hydraulic pressure chamber, the urging member being accommodated in an urging-member accommodating chamber, to which a front surface of the piston is exposed, and urging the piston in a retracting direction; and
the hydraulic pressure chamber and the urging-member accommodating chamber are arranged radially inwardly with respect to the first cylinder portion of the first clutch inner provided to the first clutch actuating mechanism that is arranged axially outward with respect to the second clutch actuating mechanism, and
wherein first and second hydraulic pressure passages for exerting hydraulic pressures on the hydraulic pressure chambers of the first and second clutch disconnection/connection control mechanisms in a mutually independent manner are provided coaxially within the first driven shaft that penetrates the first and second clutch disconnection/connection control mechanisms.

* * * * *

UNITED STATES PATENT AND TRADEMARK OFFICE
CERTIFICATE OF CORRECTION

PATENT NO. : 7,665,591 B2  Page 1 of 1
APPLICATION NO. : 11/642869
DATED : February 23, 2010
INVENTOR(S) : Ieda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 508 days.

Signed and Sealed this

Twenty-eighth Day of December, 2010

David J. Kappos
*Director of the United States Patent and Trademark Office*